United States Patent

Bradshaw et al.

[11] Patent Number: 4,952,321
[45] Date of Patent: Aug. 28, 1990

[54] PROCESS OF REMOVING AND CONCENTRATING DESIRED IONS FROM SOLUTIONS

[75] Inventors: Jerald S. Bradshaw, Provo, Utah; Maria Bochenska, Gdansk, Poland; Krzysztof E. Krakowiak, Provo, Utah; Jan F. Biernat, Gdansk-Wrzeszcz, Poland; Bryon J. Tarbet, Provo, Utah; Ronald L. Bruening, Provo, Utah; Reed M. Izatt, Provo, Utah

[73] Assignee: Brigham Young University, Provo, Utah

[21] Appl. No.: 255,353

[22] Filed: Oct. 7, 1988

[51] Int. Cl.$^5$ .............................................. B01D 15/00
[52] U.S. Cl. .................................... 210/670; 210/679; 210/688
[58] Field of Search ................. 210/670, 679, 681, 688

[56] References Cited

U.S. PATENT DOCUMENTS 4,659,512  4/1987  Macedo et al. ...................... 210/688

Primary Examiner—Ivars Cintins

[57] ABSTRACT

The process of the invention comprises removing and concentrating certain ions, such as the transition metal ions, from solutions thereof admixed with other ions which may be present in much higher concentrations by forming a complex of the desired ion(s) with a compound

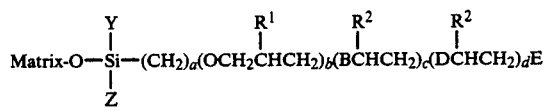

B and D are each a radical selected from the group of $N(R^3)$, $N(R^3)CH_2$, O, $OCH_2$, S and $SCH_2$, but B or D must be $N(R^3)$ or $N(R^3)CH_2$; E is a radical selected from the group consisting of H, $NH(R^3)$, SH, OH, lower alkyl, and Y and Z are radicals selected from the group of Cl, $OCH_3$, $OC_2H_5$, methyl, ethyl and halogenated substituents thereof, and O-matrix; $R^1$ is a radical selected from the group consisting of H, SH, OH, lower alkyl and aryl such as phenyl, naphthyl and pyridyl; $R^2$ is a radical selected from the group consisting of H or lower alkyl; $R^3$ is a radical selected from the group consisting of H, lower alkyl and aryl such as phenyl, naphthyl and pyridyl; a=2 to about 10; b=1; c=1 to about 2000; d=0 to about 2000.

where matrix is selected from the group consisting of sand, silica gel, glass, glass fibers, alumina, nickel oxide, zirconia, or titania e.g., by flowing the solution through a chromatography column packed with the compound, breaking the complex, e.g., by flowing a receiving liquid through the column in much smaller amount than the amount of solution passed through it to remove and concentrate the desired ion(s) in solution in the receiving liquid and recovering the desired ion(s) from the receiving liquid. The concentrated ions can then be analyzed or recovered using well known procedures.

21 Claims, 1 Drawing Sheet

PROCESS OF REMOVING AND CONCENTRATING DESIRED IONS FROM SOLUTIONS

INTRODUCTION

The process of the present invention comprises removing and concentrating certain ions, such as the transition metal ions, from solutions thereof admixed with other ions which may be present in much higher concentrations, by forming a complex of the desired ions with an amine-containing hydrocarbon covalently bonded to an inorganic matrix (compounds of Formula 1), e.g., by flowing such solutions through a chromatography column packed with a compound of Formula 1, breaking the complex, e.g., by flowing a receiving liquid in much smaller volume than the volume of solution passed through the column to remove and concentrate the desired ions in solution in the receiving liquid. The receiving liquid may be (1) analyzed by known methods, and (2) the desired ions may be recovered from it.

The amine-containing intermediates covalently bonded to an inorganic matrix, e.g., sand, silica gel, glass, glass fibers, alumina, nickel oxide, zirconia, titania and the like, which are used to separate the desired cations are shown in Formula 1.

Formula 1

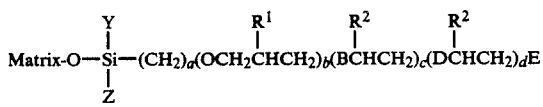

B and D = any combination of $N(R^3)$ or $N(R^3)CH_2$ or O or $OCH_2$ or S or $SCH_2$, but B or D must be $N(R^3)$ or $N(R^3)CH_2$; E = H, $NH(R^3)$, SH, OH, lower alkyl, or $[N(R^3)CH_2CH(R^1)CH_2]_bO(CH_2)_aSiYZ(O\text{-matrix})]$; Y and Z = Cl, $OCH_3$, $OC_2H_5$, methyl, ethyl or halogenated substituents thereof, or O-matrix; $R^1$ = H, SH, OH, lower alkyl or aryl such as phenyl, naphthyl or pyridyl; $R^2$ = H or lower alkyl; $R^3$ = H, lower alkyl or aryl such as phenyl, naphthyl or pyridyl; a = 2 to about 10; b = 1; c = 1 to about 2000; d = 0 to about 2000.

Where matrix = sand, silica gel, glass, glass fibers, alumina, nickel oxide, zirconia, or titania The process of selectively and quantitatively removing and concentrating a selected ion or group of ions of the transition metal type. e.g., copper, silver, mercury, lead, zinc, and other transition metals, present at low concentrations from a plurality of other ions in a multiple ion solution in which the other ions may be present at much higher concentrations comprises bringing the multiple ion solution into contact with a compound of Formula 1 of the invention which causes the desired ion(s) to complex with said compound and breaking the complex with a receiving liquid which takes the ion(s) into solution in a concentrated form. The receiving liquid may be (1) analyzed by known methods, and (2) the ion(s) may be recovered therefrom.

The preferred embodiment disclosed herein involves carrying out the process by bringing a large volume of the multiple ion solution into contact with a compound of Formula 1 of the invention in a separation column through which the mixture is first flowed to complex the desired ion or ions with said compound followed by the flow through the column of a smaller volume of a receiving liquid such as dilute aqueous hydrochloric or nitric acid, for example, to break the complex by chemical or thermal means, dissolve the desired ions and carry them out of the column in a concentrated form. Other equivalent apparatus may be used instead of a column, e.g., a slurry which is filtered and washed with a receiving liquid to break the complex. The desired metal ions may then be analyzed by known methods, and/or recovered from the receiving phase by well known procedures.

More particularly, the said process comprises placing the bonded matrix amine compound of Formula 1 in a contacting device such as a tall column, causing a large volume of the mixture of ions to flow through the column where the desired metal ions complex with the bonded matrix which separates them from the rest of the mixture which flows out of the column, then flowing a small volume of the receiving liquid through the column to break the complex and dissolve and carry out of the column the desired metal ion(s). The desired metal ions may then be analyzed by known methods such as atomic absorption spectroscopy, and/or recovered from the receiving liquid by well known procedures.

BACKGROUND OF THE INVENTION

The fact is known that amine-containing hydrocarbon ligands present as solutes in a solvent such as water are characterized by their ability to selectively form strong bonds with the transition metal ions or groups of these ions present as solutes in the same solvent as described in a book by R. M. Smith and A. E. Martell, CRITICAL STABILITY CONSTANTS VOL. 2: AMINES, Plenum Press, New York, 1975, pp. 1–401. However, researchers have not previously been able to effectively incorporate amine-containing hydrocarbon ligands into separation systems where the behavior of the amine-containing ligands in the separation systems in comparison to that of the amine-containing ligand as a solute is unchanged and/or the amine-containing ligand will remain in the separation system for repeated separations of cations. Articles such as those entitled SILANE COMPOUNDS FOR SILYLATING SURFACES by E. P. Plueddemann, in "Silanes, Surfaces and Interfaces Symposium, Snowmass, 1985," Ed. by D. E. Leyden, Gordon and Breach, Publishers, 1986, pp. 1–25 and SILANE COUPLING AGENTS by E. P. Plueddemann, Plenum Press, 1982, pp. 1–235 list many different types of organic materials which have been attached to silane compounds and discusses some of their properties. The preparation and uses of amine-containing hydrocarbons attached to silane or silica through a hydrocarbon linkage is discussed. The structures reported in those publications contained only aminopropyl and ethylene diaminopropyl groups (Formula 1 where a - 3, b=0, c—0 or 1, d=0, B=NH, D is not present, E—H or NH2 and R2 —H). These latter compounds were used to complex copper ions.

E. P. Plueddemann in METAL EXTRACTION FROM SOLUTION AND IMMOBILIZED CHELATING AGENTS USED THEREFORE. Canadian Patent No. 1,196,618 of Nov. 12. 1985 reported the preparation of a variety of amine-containing silica gel materials. These materials were made by first reacting chloropropyltrimethoxysilane with the amine forming a trimethoxysilane containing the amine function which was coated onto silica gel and heated to effect a covalent attachment of the amine to the silica gel. The resulting compound had the amine function three carbon atoms removed from silica. These materials do complex and thus remove heavy metals. However, these types of aminopropyl functions are not completely stable as discussed in the next paragraph. The Plueddemann Canadian patent lists other references concerning the same type of silica gel-bound amine complexing materials.

It is known fact that amine functional groups attached to silica gel, where the amine function is three carbon atoms removed from the silica gel, are not completely stable. E. P. Plueddemann, in the above mentioned article in the book edited by D. E. Leyden, reported that his amine materials (amine group three atoms removed from silane) slowly lost their ability to complex copper II. D. M. Wonnacott and E. V. Patton in HYDROLYTIC STABILITY OF AMINOPROPYL STATIONARY PHASES USED IN THE SIZE-EXCLUSION CHROMATOGRAPHY OF CATIONIC POLYMERS, Journal of Chromatography, vol. 389, pp. 103–113 (1987) and T. G. Waddell, D. E. Leyden and M. T. DeBello in THE NATURE OF ORGANOSILANE TO SILICA-SURFACE BONDING, Journal of American Chemical Society, vol. 103, pp. 5303–5307 (1981) discuss the stability of the aminopropyl-silica gel types of materials. In the conclusion to the Wonnacott and Patton article it is stated that "aminoalkyl silanes which have been used extensively in the synthesis of silica-based, weak ion exchangers do not lend themselves to this type of chromatography due to their hydrolytic instability."

Bonded silica gel phase supports containing amine functions have been prepared by reacting the amine with 3-glycidoxypropylsilane bonded to silica gel. S. H. Chang, K. M. Gooding and F. E. Regnier in USE OF OXIRANES IN THE PREPARATION OF BONDED PHASE SUPPORTS, Journal of Chromatography, vol. 120, pp. 321–333 (1976) and M. A Bagnoud, J. L Veuthey and W. Haerdi in INTERACTIONS SILICE METALLIQUE-SOLUTE: POSSIBILITE d'APPLICATIONS en PRECONCENTRATION et en CHROMAOGRAPHIE d'ECHANGE de LIGANDS (LEC), Chimica, vol. 40, pp. 432–434 (1986) have reacted amines with 3.glycidoxypropyl-bonded silica gel. Chang, Gooding and Regnier reported on four such compounds prepared from diethylamine [Formula 1, where a=3, b=1, c and d=0, $R^1$=OH, and E =N (ethyl)2], dimethylaminoethanol [FIG. 1, where a=3, b=1, c=1, d=0, B=0, $R^1$=OH, $R^2$=H, E - N (methyl)2], diethylaminoethanol [same as the previous structure except N(ethyl)2 at the end], and polyethyleneamine [Formula 1, same as previous formula except c is a large number and E=$NH_2$]. These materials were used to separate proteins but not metal cations. Bagnoud, Veuthey and Haerdi prepared a compound from a cyclic tetraamine (cyclam) which does not have a structure similar to the structures of FIG. 1. This material was used to bind metal ions and the bound metallic material was used in liquid exchange chromatography to separate certain organic compounds. In neither of these studies were metal ions separated and recovered.

There is a particular need in modern society to (1) measure the concentrations of heavy metal cations in the low part per billion (PPB) concentration; (2) to remove low levels of toxic heavy metal ions from solutions such as potable water; and (3) to recover valuable metal ions present in solution at low levels. For example the allowable amounts of lead, mercury, cadmium and silver ions in drinking water are in the low PPB levels. Present methods for analysis of these cations are not accurate at those levels without time consuming methods to concentrate the cations up to the low part per million level. Furthermore, removal of the metals is not selective, but is expensive and equipment intensive using present methods. Thus, the complexing properties of hydrolytically stable amine-containing hydrocarbon ligands attached to an inorganic support such as silica gel or titanized silica gel are of the utmost importance for the repeated separation and concentration of certain heavy metal cations for analysis, and/or recovery purposes. The process of the present invention using the amine-containing materials of Formula 1 accomplish this feat.

SUMMARY OF THE INVENTION

The process of the present invention uses the amine-containing hydrocarbon ligand covalently bonded to an inorganic support, e.g. sand, or silica gel, glass, glass fibers, alumina, nickel oxide, zirconia or titania of Formula 1, which are characterized by high selectivity for and removal of desired metal ions or groups of metal ions such as the transition metal ions present at low concentrations from the source phase containing a mixture of these metal ions with the ions one does not desire to remove-which may be present in much greater concentrations in the solution, in a separation device such as a column through which the solution is flowed. The process of selectively removing and concentrating the desired ion(s) is characterized by the ability to quantitatively complex from a large volume of solution the desired ion(s) when they are present at low concentrations. The said ions are recovered from the separation column by flowing through it a small volume of a receiving phase which contains a solubilized reagent which need not be selective, but which will strip the ions from the ligand quantitatively. The analysis of the desired metal ions in the concentrated solution is accomplished by known methods such as atomic absorption spectroscopy. The recovery of the desired metal ions from the receiving phase is easily accomplished by well known procedures. The process for producing the compounds of Formula 1 will be mentioned but is not a part of the present invention.

BRIEF DESCRIPTION OF THE DRAWINGS

The invention will be described and illustrated by reference to a drawing in which.

DESCRIPTION OF THE PREFERRED EMBODIMENT OF THE INVENTION

Figure 1:
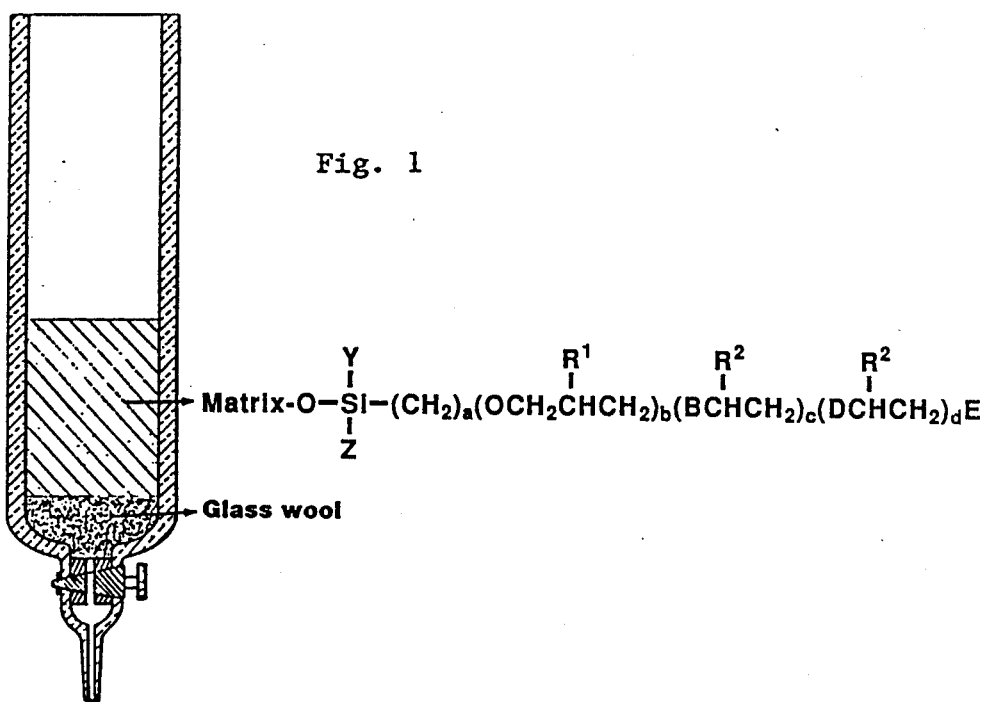
FIG. 1 represents schematically a suitable column for holding the matrix bonded amine-containing hydrocarbon ligand material through which a solution of metal ions can be flowed to complex selectively with a desired ion or group of ions in accordance with the invention.

The preferred embodiment of the ion-recovery process of the invention utilizes the compounds represented by Formula 1. The process of producing these new compounds is not an aspect of the present invention but will be mentioned briefly here.

Amine-containing hydrocarbon ligands must be covalently bonded to the inorganic support in accordance with the invention. For example, the inorganic support such as silica gel is first heated with 3-glycidoxypropyltrimethoxysilane to produce a 3-glycidoxypropyl-bound silica gel. This gel is then heated with the appropriate amine to effect a covalent

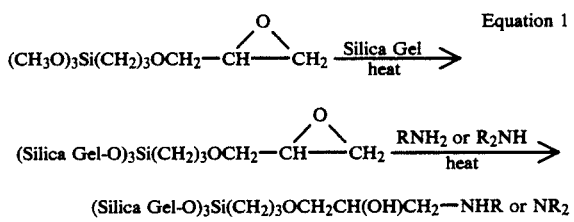

Equation 1 bond as shown in Equation 1. The nature of the amine will determine what B, D, E and $R^2$ are in Formula 1.

The following example are given to illustrate two representative compounds which have been made in accordance with Formula 1 of the present invention. Other amine-containing hydrocarbons bonded to an inorganic support were and can be made in the same manner.

EXAMPLE 1

In this example, an amine-containing hydrocarbon bonded to a silica gel was made wherein $a=3$, $b=1$, $c=5$, $d=0$, $R^1$=hydroxy, $R^2$=hydrogen, $B=NH$, D is not present since $d=0$, $E=NHCH_2CH(OH)CH_2O(CH_2)_3Si(O$-silica gel$)_3$, and Y and $Z=O$-silica gel groups in Formula 1.

Silica gel (60–200 mesh)(1.6 kilograms) was suspended in 7 liters of toluene which contained 304 grams of 3.glycidoxypropyltrimethoxysilane. The gel was stirred slowly (to insure that the gel was not physically damaged) and the mixture was heated at 100° C. for 8 to 18 hours. Then, 175–225 grams of pentaethylenehexaamine was slowly added and the slowly stirred solution was heated at 100° C. for 5–10 hours. The solvent was filtered and the solid amine-bound silica gel was dried in air in a well ventilated hood.

EXAMPLE 2

In this example, an amine-containing hydrocarbon bonded to titanized silica gel was made wherein $a=3$, $b=1$, $c=5$, $d=0$, $R^1$=hydroxy, $R^2$=hydrogen, $B=NH$, D is not present, $E=NHCH_2CH(OH)CH_2O(CH_2)_3Si(O$-Titanized Silica gel$)_3$, and Y and $Z=O$-Titanized Silica gel groups in Formula 1.

In this regard, the titanized silica gel was first prepared as follows. 60–200 Mesh silica gel (50 g) was suspended in 200 ml of dry toluene. Tetraisopropoxytitanium (20 ml) was slowly added to the stirred reaction mixture. Heat was evolved. The resulting mixture was allowed to stand for 16 hours and filtered. The residue was washed succesively with 100 ml of toluene, 100 ml of methanol and 100 ml of water and allowed to air dry at room termperature. The overall weight of the silica gel increased to 52.5 g resulting in 1.25 mmoles of $TiO_2$ per gram of material.

Pentaethylenehexaamine was attached to the titanized silica gel in the same manner as in Example 1 using 20 g of titanized silica gel and 4 ml of 3-glycidoxypropyltrimethoxysilane in 50 ml of toluene to give the 3-glycidoxypropy-titanized silica gel material and then 10 g of this latter titanized silica gel was reacted with 3 ml of pentaethylenehexaamine in 50 ml of refluxing methanol for 1 hour.

METAL ION RECOVERY AND CONCENTRATION PROCESS

The metal ion recovery and concentration process of the invention relates to the selective recovery of desired metal ions from mixtures thereof with other metal ions using the compounds of Formula 1 of the invention as defined above. Effective methods of recovery and/or separation of metal ions, Particularly the transition metal ions, from other metal ions in water supplies, waste solutions, deposits and industrial solutions and silver recovery from waste solutions, e.g., from emulsions on photographic and X-ray film, represent a real need in modern technology. These ions are typically present at low concentrations in solutions containing other ions at much greater concentrations. Likewise there is a need to concentrate these metal ions so that an effective analysis using well known methods such as atomic absorption spectroscopy can be carried out. Hence, there is a real need for a process to selectively recover and concentrate these metal ions. The present invention accomplishes this separation and concentration effectively and efficiently by the use of compounds selected from the families represented by Formula 1.

The amine-containing inorganic matrix material of Formula 1 is placed in a column as shown in FIG. 1. An aqueous solution containing the desired ion or ions, in a mixture of other ions which may be in a much greater concentration, is passed through the column. The flow rate for the solution may be increased by applying pressure (with a pump) on the top of the column or applying a vacuum in the receiving vessel. After the solution has passed through the column, a much smaller volume of a recovery solution, i.e. an aqueous acid solution, which will protonate the amine groups of the ligands thereby releasing the metal ions, is passed through the column. This receiving solution contains only the desired metal ions in a concentrated form for subsequent analysis and/or recovery.

The following examples of separations and recoveries of transition metal ions by the inorganic support-bound amine-containing materials of Examples 1 and 2 and materials prepared in a similar manner are given as illustrations. These examples are illustrative only, and are not comprehensive of the many separations of transition metal ions that are possible using the materials of Formula 1.

EXAMPLE 3

In this example, 2 grams of the silica gel-bound amine-containing hydrocarbon of Example 1 was placed in a column as shown in FIG. 1. A 500 ml solution of about 10 ppm of $Cu^{2+}$ in 0.1 M aqueous $MgCl_2$ was passed through the column using a vacuum pump at 600 torr to increase the flow rate. A 10 ml aqueous solution of 1 M HCl was passed through the column. An analysis of the recovery solution by atomic absorption spectroscopy (AA) showed that greater than 99% of the copper II ions originally in the 500 ml copper II solution was in the 10 ml recovery solution.

EXAMPLE 4

The experiment of Example 3 was repeated with about 1 ppm of $Cd^{2+}$ in an aqueous solution of 0.1 M $MgCl_2$. Again, greater than 99% of the $Cd^{2+}$ ion in the original solution was found in the recovery solution.

EXAMPLE 5

The experiment of Example 3 was repeated with about 13 ppm of $Hg^{2+}$ in an aqueous solution of 0.1 M $MgBr_2$. In this case, 42% of the $Hg^{2+}$ ion in the original solution was found in the recovery solution.

EXAMPLE 6

In this example, the titanized silica gel-amine material of Example 2 was used to separate 10 ppm $Cu^{2+}$ in an aqueous solution of 0.1 M $MgCl_2$ as in Example 3. The $Cu^{2+}$ was removed and concentrated in the same manner and with the same results as the Example 3.

EXAMPLE 7

The amine material of Example 1 has also been used to make separations among the transition metals and the common salt ions in solution. An example of this is the separation and concentration of $Cd^{2+}$, $Pb^{2+}$ and $Cu^{2+}$ from $Na^+$, $K^+$, $Mg^{2+}$ and $Ca^{2+}$ solutions normally found in potable water. The solution (1000 ml) was passed through the column, then a 10 ml of 1 M aqueous HCl recovery solution. The 10 ml recovery solution contained $Cd^{2+}$, $Pd^{2+}$ and $Cu^{2+}$ in concentrated form. The concentrated solution was analyzed by atomic absorption spectroscopy and found to contain the expected amounts of the three cations.

EXAMPLE 8

The experiment of Example 7 was repeated with trace concentrations of $Zn^{2+}$, $Mn^{2+}$ and $Ni^{2+}$ in an aqueous solution containing the common salts found in ocean water at the concentrations found in ocean water. The 10 ml recovery solution was found to contain only $Zn^{2+}$, $Mn^{2+}$ and $Ni^{2+}$ in the expected concentrations.

EXAMPLE 9

In this example, 2 grams of the silica gel-bound amine-containing hydrocarbon prepared as the material of Example 1, except that ethylene diamine was used in the Example 9 material rather than pentaethylenehexaamine of Example 1. The amine-containing silica gel used in Example 9 was that shown in Formula 1 where $a=3$, $b=1$, $c=1$, $d=0$, $B =NH$, $E=NHCH_2CH(OH)CH_2O(CH_2)_3 Si(O$-silica gel$)_3$, $R^1=OH$ and $R^2=H$. Solutions (500 ml) of $Cu^{2+}$ and $Pd^{2+}$ ions in aqueous 0.1 M $Mg(NO_3)_2$ solutions were each separated as in Example 3. In both cases, over 99% of the $Cu^{2+}$ or $Pd^{2+}$ was recovered in the recovery solutions.

From the foregoing, it will be appreciated that the inorganic matrix-bound amine-containing hydrocarbon ligands of Formula 1 of the present invention provide a material useful for the separation and concentration of the transition metal cations from mixtures of those cations with other metal cations. The transition metals can then be analyzed and/or recovered from the concentrated recovery solution by standard techniques known in the science of these materials.

Although the process of separating and concentrating certain metal ions in this invention has been described and illustrated by reference to certain specific silica gel-bound amine-containing hydrocarbon ligands of Formula 1, processes using analogs of these amine-containing hydrocarbon ligands are within the scope of the processes of the invention as defined in the following claims.

Having thus described and illustrated the invention, what is claimed is:

1. The process of removing and concentrating desirable ions from a mixture thereof in solution with other ions which comprises complexing the desired ions in said solution with a compound comprising an inorganic support covalently bonded to a amine-containing hydrocarbon compound from the class consisting of

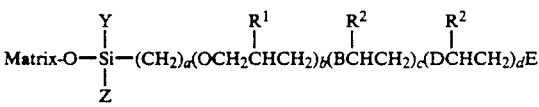

B and D are each a radical selected from the group of $N(R^3)$, $N(R^3)CH_2$, O, $OCH_2$, S and $SCH_2$, but B or D must be $N(R^3)$ or $N(R^3)CH_2$; E is a radical selected from the group consisting of H, $NH(R^3)$, SH, OH, lower alkyl, and $N(R^3)CH_2CH(R^1)CH_2)_bO(CH_2)_aSiYZ(O$-matrix); Y and Z are radicals selected from the group of Cl, $OCH_3$, $OC_2H_5$, methyl, ethyl and halogenated substituents thereof, and O-matrix; $R^1$ is a radical selected from the group consisting of H, SH, OH, lower alkyl and phenyl, naphthyl and pyridyl; $R^2$ is a radical selected from the group consisting of H or lower alkyl; $R^3$ is a radical selected from the group consisting of H, lower alkyl and aryl such as phenyl, naphthyl and pyridyl; $a=2$ to about 10; $b=1$; $c=1$ to about 2000; $d =0$ to about 2000

Where matrix is selected from the group consisting of sand, silica gel, glass, glass fibers, alumina, nickel oxide, zirconia, or titania breaking said complex to liberate the complexed ions with and dissolving said liberated ions in a receiving liquid in much smaller volume than the volume of said solution from which the desired ions have been removed.

2. A process of separating a selected metal ion or ions from a plurality of other ions including Ca(II), Mg(II), $Na^+$ and $K^+$ in a multiple ion solution characterized by flowing the multiple ion solution through a column packed with a material comprising an inorganic support covalently bonded to an amine-containing hydrocarbon compound from the classes consisting of:

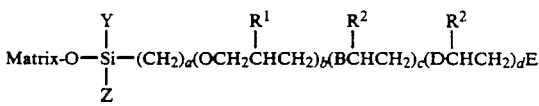

B and D are each a radical selected from the group of $N(R^3)$, $N(R^3)CH_2O$, $OCH_2$, S and $SCH_2$, but B or D must be $N(R^3)$ or $N(R^3)CH_2$; E is a radical selected from the group consisting of H, $NH(R^3)$, SH, OH, lower alkyl, and $N(R^3)CH_2CH(R^1)CH_2)_bO(CH_2)_a8iYZ(O$-matrix); Y and Z are radicals selected from the group of Cl, $OCH_3$, $OC_2H_5$, methyl, ethyl and halogenated substituents thereof, and O-matrix; $R^1$ is a radical selected from the group consisting of H, SH, OH, lower alkyl and phenyl, naphthyl and pyridyl; $R^2$ is a radical selected from the group consisting of H or lower alkyl; $R^3$ is a radical as phenyl, naphthyl, and pyridyl; $a=2$ to about 10; $b=1$; $c=1$ to about 2000; $d=0$ to about 2000.

where matrix is selected from the group consisting of sand, silica gel, glass, glass fibers, alumina, nickel oxide, zirconia, or titania under conditions which cause said material to complex with the selected metal ion or ions and remove it or them from said multiple ion solution, separating said multiple ion solution from which said selected ion or ions has been removed from said complex, and breaking said complex to free and recover said selected ion or ions in a receiving liquid.

3. The process as set forth in claim 2 in which said inorganic support is silica gel, $a=3$, $b=1$, $c=5$, $d=0$, $R^1$=hydroxy (OH), $R^2$=hydrogen, $R^3$ hydrogen, B $R^3$ amino D is absent since $d=0$, E $NHCH_2CH(OH)CH_2O(CH_2)_3Si(O.silica\ gel)_3$, and Y and Z are selected from the group consisting of O.silica gel [or]and methoxy ($OCH_3$).

4. The process set forth in claim 2 in which matrix is silica gel, $a=3$, $b=1$, $c=1$, $d=0$, $R^1$=hydroxy (OH), $R^2$=hydrogen, $R^3$=hydrogen, B= $R^3$-amino, $E=NHCH_2CH(OH)CH_2O(CH_2)_3Si(O\text{-silica gel})_3$, and Y and Z are selected from the group consisting of O-silica gel and methoxy ($OCH_3$).

5. The process as set forth in claim 2 in which said inorganic support is titanized silica gel, $a=3$, $b=1$, $c=5$, $d=0$, $R^1$=hydroxy (OH), $R^2$=hydrogen, $R^3$=hydrogen, B=$R^3$-amino, $d=0$, $E=NHCH_2CH(OH)CH_2O(CH_2)_3Si(O\text{-titanized silica gel})_3$, and Y and Z are selected from the group consisting of O-silica gel and methoxy ($OCH_3$).

6. The process as set forth in claim 2 in which the selected metal ion is Cu(II).

7. The process as set forth in claim 2 in which the selected metal ion is Pb(II).

8. The process as set forth in claim 2 in which the selected metal ion is Ag(I).

9. The process as set forth in claim 2 in which the selected metal ion is Ru(III).

10. The process as set forth in claim 2 in which the selected metal ion Pd(II).

11. The process as set forth in claim 2 in which the selected metal ion is Ir(III).

12. The process as set forth in claim 2 in which the selected metal ion is Zn(II).

13. The process as set forth in claim 2 in which the selected metal ion is Rh(II).

14. The process as set forth in claim 2 in which the selected metal ion is Cd(II).

15. The process as set forth in claim 2 in which the selected metal ion is Hg(II).

16. The process as set forth in claim 2 in which the selected metal ion is Os(II).

17. The process as set forth in claim 2 in which the selected metal ion is M(II).

18. The process as set forth in claim 2 in which the selected metal ions are Au(I) and Au(II).

19. The process as set forth in claim 2 in which the selected metal ions are Pt(II) and Pt(IV).

20. The process as set forth in claim 2 in which the selected metal ions are Co(III) and Co(II).

21. The process as set forth in claim 2 in which the selected metal ions are Cr(II) and Cr(III).

* * * * *